(12) United States Patent
Klabisch et al.

(10) Patent No.: US 6,607,074 B2
(45) Date of Patent: Aug. 19, 2003

(54) DRIVE STATION FOR A CHAIN SCRAPER CONVEYOR FOR MINING OPERATIONS

(75) Inventors: Adam Klabisch, Dortmund (DE); Gerhard Merten, Lunen (DE); Hans Meya, Werne (DE); Ulrich Mohn, Lunen (DE)

(73) Assignee: DBT GmbH (DE)

( * ) Notice: Subject to any disclaimer, the term of this patent is extended or adjusted under 35 U.S.C. 154(b) by 15 days.

(21) Appl. No.: 09/975,709

(22) Filed: Oct. 11, 2001

(65) Prior Publication Data

US 2002/0074215 A1 Jun. 20, 2002

(51) Int. Cl.[7] .............................................. B65G 23/06
(52) U.S. Cl. ....................................................... 198/834
(58) Field of Search ................................. 198/834, 837

(56) References Cited

U.S. PATENT DOCUMENTS

| | | | | |
|---|---|---|---|---|
| 1,755,450 A | * | 4/1930 | Mojonnier | 198/834 |
| 3,443,680 A | * | 5/1969 | Brill | 198/733 |
| 3,871,513 A | * | 3/1975 | Georg et al. | 198/735.4 |
| 4,327,996 A | | 5/1982 | Affolder | |
| 4,372,903 A | | 2/1983 | Affolder | |
| 5,605,220 A | * | 2/1997 | Krohm | 198/735.6 |
| 6,227,354 B1 | * | 5/2001 | Howden et al. | 198/834 |
| 6,422,382 B1 | * | 7/2002 | Ertel et al. | 198/860.1 |
| 6,543,609 B2 | * | 4/2003 | Layne et al. | |

FOREIGN PATENT DOCUMENTS

| | | |
|---|---|---|
| DE | 23 40 318 C2 | 2/1975 |
| DE | 28 47 565 C2 | 5/1980 |
| DE | 39 23 320 A1 | 1/1991 |
| DE | 195 32 391 A1 | 3/1997 |

* cited by examiner

Primary Examiner—Christopher P. Ellis
Assistant Examiner—Richard Ridley
(74) Attorney, Agent, or Firm—Cook, Alex, McFarron, Manzo, Cummings & Mehler, Ltd.

(57) ABSTRACT

A drive station for a chain scraper conveyor for mining operations, in which the height position of a drive shaft, can be set by means of an adaptor plate (50), which can be fastened at different height levels on the machine frame of the drive station. The adaptor plates (50) includes a machine frame side inner side (52) and a drive side outer side (53), onto which the drive set can be fastened. The position of fastening screws (56), (57) in elongate holes (54), (55), in the adaptor plate (50) the direction of an asymmetric setting key (30) and the rotational position of an annular disc plate (40) with an outer ring (42) arranged eccentrically to an inner ring (41), determine the assembly position in each case.

19 Claims, 5 Drawing Sheets

DRIVE STATION FOR A CHAIN SCRAPER CONVEYOR FOR MINING OPERATIONS

The invention relates to a drive station for a chain scraper conveyor for mining operations, especially for a face conveyor, with a machine frame having a conveyor base, on which can be mounted an exchangeable, drive shaft including an axle and vertical side cheeks, joined torsionally fixed to a chain sprocket and which on at least one of its vertical side cheeks has a flange mounting zone with a lead-through and borings for flange mounting a drive set which can be coupled to the drive shaft.

A previously proposed drive station is described in DE 39 23 320 A1. In the previously proposed drive station the flange mounting zone is formed in a flange plate, which is fastened to a tensioning cradle, which can be moved relative to a stationary part of the machine frame by means of tensioning cylinders.

According to the individual operational purpose, operational conditions and application site of the face conveyor, conveyor chains with different wire diameters and drive shafts with different chain sprockets, especially chain sprockets with different numbers of teeth are employed. Thus at the state of the technology for instance standardised standard scraper chains with wire diameters of 30 mm, 34 mm, 38 mm or 42 mm are used. In the latest face conveyors chain elements with a diameter of 48 mm are applied with success even in double inboard chain conveyors. For each link diameter a specially matched chain sprocket with at most six or seven teeth is used. At the state of the technology it has previously been customary to provide a special machine frame matched to the necessary dimensions for each wire diameter and each chain sprocket, which works together with a type of conveyor which can be used for all wire diameters and scraper chain types. Since the conveyor plate is basically set at a fixed height level in the types of conveyor, the position of the borings and the lead-through of the coupling in the flange mounting zone varies from one drive station to another drive station, so that a correct transfer of the scrapers from the bottom run of the conveyor into the top run of the conveyor and vice versa is obtained for the individual wire diameter and the number of teeth of the chain sprocket.

The present invention has recognised the necessity of different drive stations for different wire diameters as a disadvantage and has the aim of avoiding this disadvantage in a simple and cost-effective manner.

Accordingly the present invention is directed to a drive station as set out in the opening paragraph of the present specification, in which adaptor plates are provided for the mounting of the axle of the drive shaft with an adjustable height seperation between the conveyor base and the drive shaft axis, which can be fastened on their machine frame side inner sides in various height positions on the flange mounting zone and on whose drive side outer side the drive set can be fastened.

The invention has basically recognised that with a constant height level of the conveyor base the central axis of the drive shaft differs only by a few centimeters for different chain sprockets. Thus for instance in the face conveyor drive station Type SPR 5 of the applicant the position of the chain sprocket drive shaft changes by only 40 mm between the lowest assembly position (e.g. with scraper chain/chain sprocket 34×126/7 teeth) and the highest assembly position (with scraper chain/chain sprocket 30×108/7 teeth). By the application of the adaptor plates according to the invention this maximum height difference can be bridged immediately.

The difference in height position affects here only the position of the drive shaft axis and the drive shaft relative to the conveyor base. The relative position between the drive shaft ends of the drive shaft and the drive set, which is coupled to the drive shaft remains always the same according to the invention.

Especially with a relatively large offset of the assembly position the fastening of the adaptor plates could be made into borings, which are arranged at different heights in the flange mounting zone. It is however preferably provided that the exchangeable drive shaft be an assembly unit and the adaptor plates have elongate holes perpendicular to the conveyor base, which can be engaged through by fastening screws to fasten the adaptor plates using the borings in the flange mounting zone. The advantage of the elongated holes comprises on the one hand that the adaptor plates can be fastened in any intermediate position between the lowest assembly position and the highest assembly position, above all however that adaptor plates according to the invention can be applied in any of the already available drive stations, without changes or rework having to be undertaken in their flange mounting zones. Advantageously the length of the elongate holes determines the maximum height adjustment range.

In the assembly in underground operations it is important that a determined assembly position can be established and if possible the fastening of the adaptor plates can be effected without additional means of assistance. It is therefore preferably provided that the height position of the adaptor plate can be established by means of a setting key, which can be inserted between the machine frame and the adaptor plate and engages in associated setting key cut-outs. With a setting key establishing the height position the torque created by the flanged drive or drive set can be intercepted and introduced to the machine frame or its side cheeks. Preferably for different height positions of the adaptor plates different setting keys and/or setting keys are provided with asymmetrically formed shoulders. An advantage of the setting key with asymmetrically formed shoulders is that this, after a 180° rotation, establishes a different assembly position than previously. In this configuration two different assembly positions can be established with the same setting key, which, relative to a middle assembly position, provides in each case a symmetrical offset of the adaptor plate or centre axis of the drive shaft upwards or downwards. It is especially preferred that the setting keys comprise short metal rails with a T-profile or an L-profile. Setting keys with an L-profile have asymmetrical formed shoulders and serve for setting in for example the individual extreme height positions, whilst setting keys with T-profile serve for the assembly in a more central assembly position. Furthermore it is preferably provided that the adaptor plates on their drive side plate side have a groove engageable by the setting key and borings for flange mounting the drive set whilst supporting a turning moment. The adaptor plate can for instance be provided with a setting key groove and with borings on its drive side plate surface such as are also provided in the flange mounting zone itself, so that by means of the adaptor plate the drive set is on the one hand displaced axially outwards and on the other hand is shifted vertically upwards or downwards corresponding to the assembly position of the adaptor plate.

As is known the coupling openings in the flange mounting zones are as a rule enclosed and circular. The adaptor plate has then advantageously also a circular cut-out and according to the invention is provided with a stepped annular disc plate, which engages and seals to an inner ring on the machine frame side in the coupling opening and with a drive side outer ring in the cut-out. With the annular disc plate is made possible both the entry of the drive shaft into the desired assembly position and at the same time sealing is largely obtained. For a middle assembly position the annular disc plate has two rings formed concentrically to each other. For the assembly positions or height settings which can be obtained with the asymmetrical setting keys an annular disc plate is used which has rings arranged eccentrically to each other and can be assembled in different rotational positions. Owing to the eccentricity of the two circular rings the transition formed between the cut-out in the adaptor plate and the coupling lead-through in the flange mounting zone can be filled and sealed. The assembly is further simplified if the larger inner ring has stepped through borings and can be fastened into the adaptor plate by means of screws which are countersunk in it, into tapped holes in the adaptor plate.

The adaptor plate according to the invention can, possibly together with the annular disc plate, be used with different configurations of drive shaft. Possibly the lead-throughs in the rings of the annular disc plate could also be used to support or mount the drive shaft end pin, especially in the assembly of the drive shaft. A configuration is especially preferred in which the bearings for the drive shaft are arranged in essentially rectangular or square bearing housings, which can be pushed in between an upper brace and a lower brace into a window-like bearing box formed in the machine frame, whereby the bearing housings have an assembly height, which is less than the free height in the bearing box. It is especially preferred here if the bearing housing is closed on three sides and is open on the rearmost, facing away from the conveyor side. The drive shaft can then be pushed in through the open end of the machine frame as an assembly unit into the bearing housing. The differing assembly position is possibly adjusted by the interposition of distance fillets. For the extreme assembly positions the distance fillets have the same thickness as the maximum adjustment path, for middle assembly positions two distance fillets each with a thickness corresponding to half the height adjustment path are used. The distance fillets work at the same time also as a sealing between the individual parts in the machine frame. The distance fillets can be formed as separate fillets or in one piece with closing parts, with which the bearing boxes can be locked into the open machine frame ends. Further, centering pins can be formed on the closing parts, which engage in centering holes in the bearing housings. The configuration previously named makes it possible that the assembly unit comprises the drive shaft and also the closing elements and the distance pieces. By means of the centering pins and centering holes tilting or rotation of the bearing housing can additionally be prevented.

It is especially preferred if the drive station—as is known—is configured as a tensioning frame, whereby the tensioning frame part having the flange mounting zone for fastening the adaptor plate and formed for the mounting of the drive shaft, is movable relative to the machine frame base, preferably by means of hydraulic cylinders. It is further preferred in this configuration that the machine frame part is provided with a drag plate, which is movable relative to the conveyor base, which overlaps the conveyor base up to a tongue-like cut-out on the side connecting to the conveyor pans. With the drag plate it can be prevented that open abutment positions arise in the top run with movement of the tensioning frame part.

An example of a drive station for a chain scraper conveyor according to the present invention, will now be described herein below in relation to the accompanying drawings in which.

Figure 1:
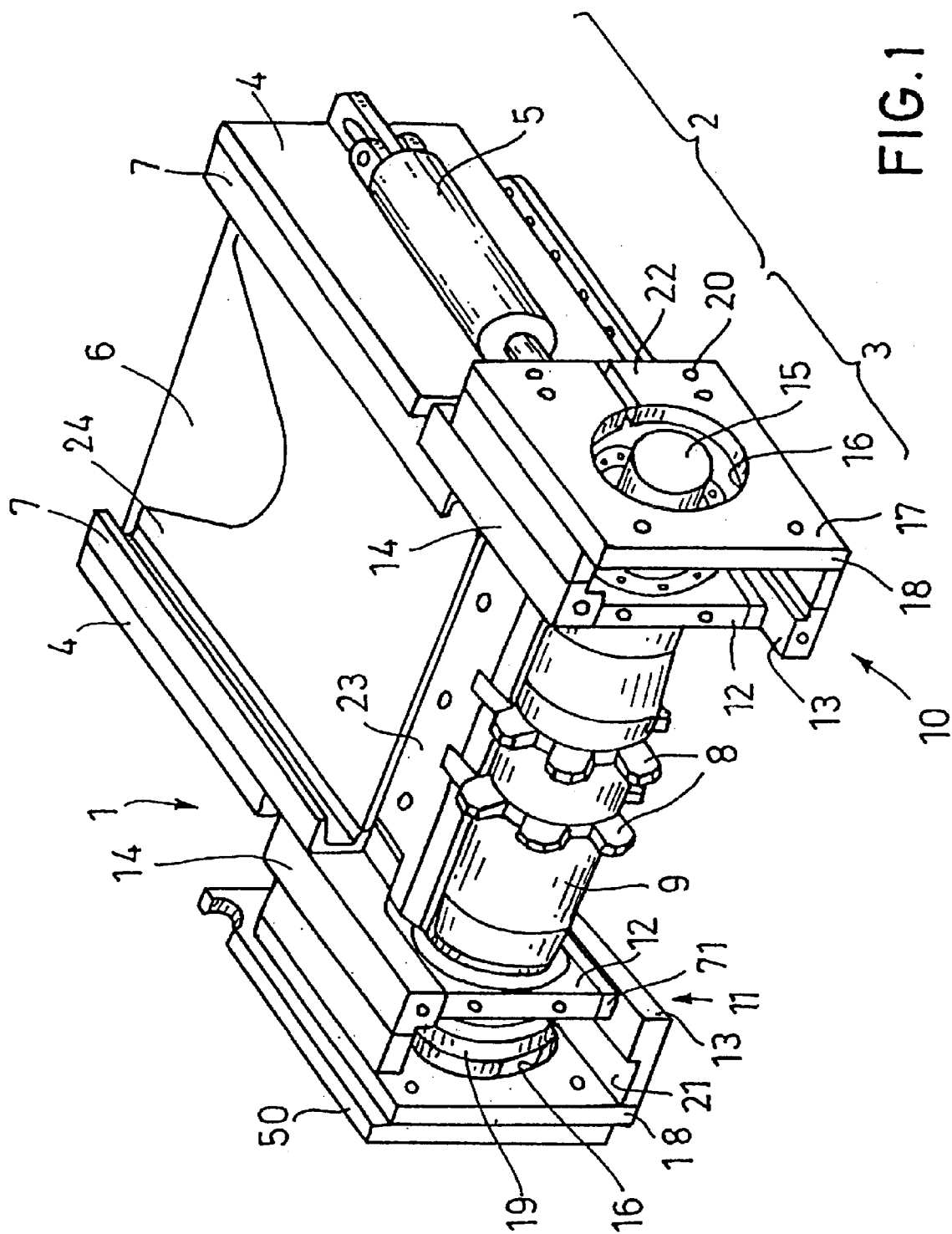
FIG. 1 shows a perspective view of a drive station with an adaptor plate attached to a rearward flange mounting zone according to the present invention.

In FIG. 1 a drive and tensioning station is referenced 10 overall, which is applied at the head end of a chain scraper conveyor, not shown further, which finds application as a face conveyor in an underground extraction operation and for instance forms the so-called auxiliary drive of the face conveyor. The principles of construction of the chain scraper conveyor, not shown, are known and it is formed from conveyor pans put together in sections, which have side profiles in which the scrapers of the scraper chain, not shown, are guided. The drive station formed as a tensioning station 10 has a two part machine frame 1 with a machine frame base 2 in its rear section and a tensioning frame part 3 in its forward section. The machine frame base 2 has fixed vertical side cheeks 4, on whose outer sides two hydraulic cylinders 5 for pushing the tensioning frame part 3 are attached by joints. Between the side cheeks 4 of the machine base 2 a conveyor plate 6 is arranged in a fixed position to whose two sides the side or channel profiles 7 are fixed guiding the scrapers, not shown, and which separates the top run from the bottom run.

In the tensioning frame part 3 of the machine frame 1 a drive shaft 9 is mounted, which has two chain sprockets 8 for a double scraper chain. The drive shaft 9 complete with the torsionally fixed chain sprockets 8 joined to it can be assembled or disassembled as an assembly unit through the open head end 11 to the front in FIG. 1 of the machine frame. In the embodiment shown the mounting of the drive shaft 9 is effected by means of two bearings set in square bearing housings 12, whereby the bearing housings themselves are pushed into a window-like bearing box bordered by a lower brace 13 and an upper brace 14 in the free height.

The right-hand shaft pin 15 of the drive shaft 9 in FIG. 1 lies free and does not extend into the coupling guide 16, which is formed in the outer side cheek plate 18 forming one flange mounting zone 17. The left-hand shaft pin end in FIG. 1 is joined torsionally fixed to a coupling socket 19, which extends through the coupling lead-through 16 in the left-hand side cheek plate 18 and extends the drive shaft 9 until it reaches into the adaptor plate 50. The construction of the adaptor plate 50 will be further explained in detail below. Between the upper and lower braces 13, 14 and the side cheek plate 18 provided with the flange mounting zone 17 intermediate, essentially U-shaped pieces 21 are arranged, which produce sufficient space for the assembly of the drive shaft 9 as an assembly unit with the shaft end pins 15 free. FIG. 1 shows further that the flange mounting zones 17 on the outer side of the side cheek plates 18 each has several, here six, borings 20, the stepped coupling lead-through 16 as well as a setting key groove 22 set out parallel to the conveyor base 6, which extends up to the rear edge of the flange mounting zone 17. Between the conveyor base 6 and the drive shaft 9 is fastened an exchangeable tongue 23 with a chain deflector which is moved together with the tensioning frame part 3 and a drag base 24 in the tensioning of the scraper chain, not shown). The running in situation for the scrapers and the scraper chain on the sprocket 8 is therefore always the same independently of the tensioning position of the tensioning frame part 3 relative to the machine frame base 2.

Figure 3:
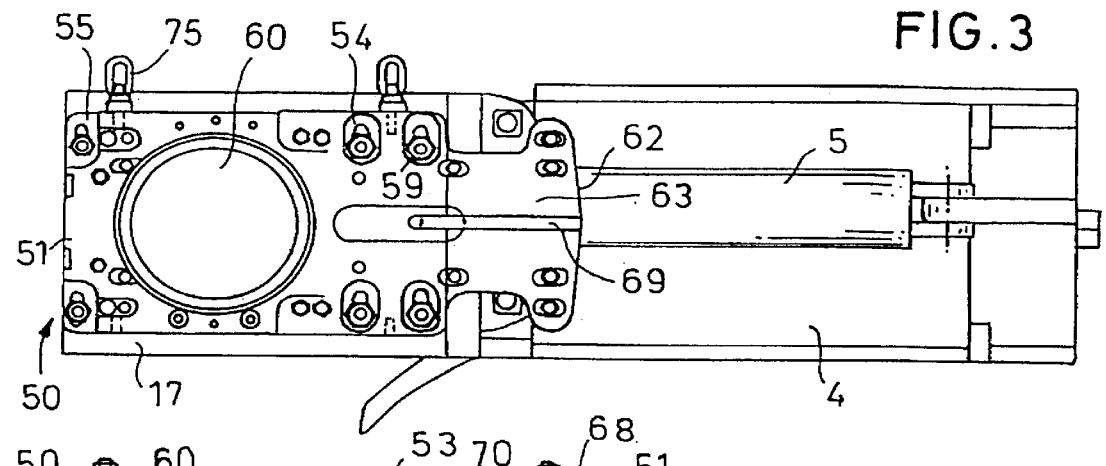
FIG. 3 shows a side view of the drive station shown in FIG. 2.
Figure 2:
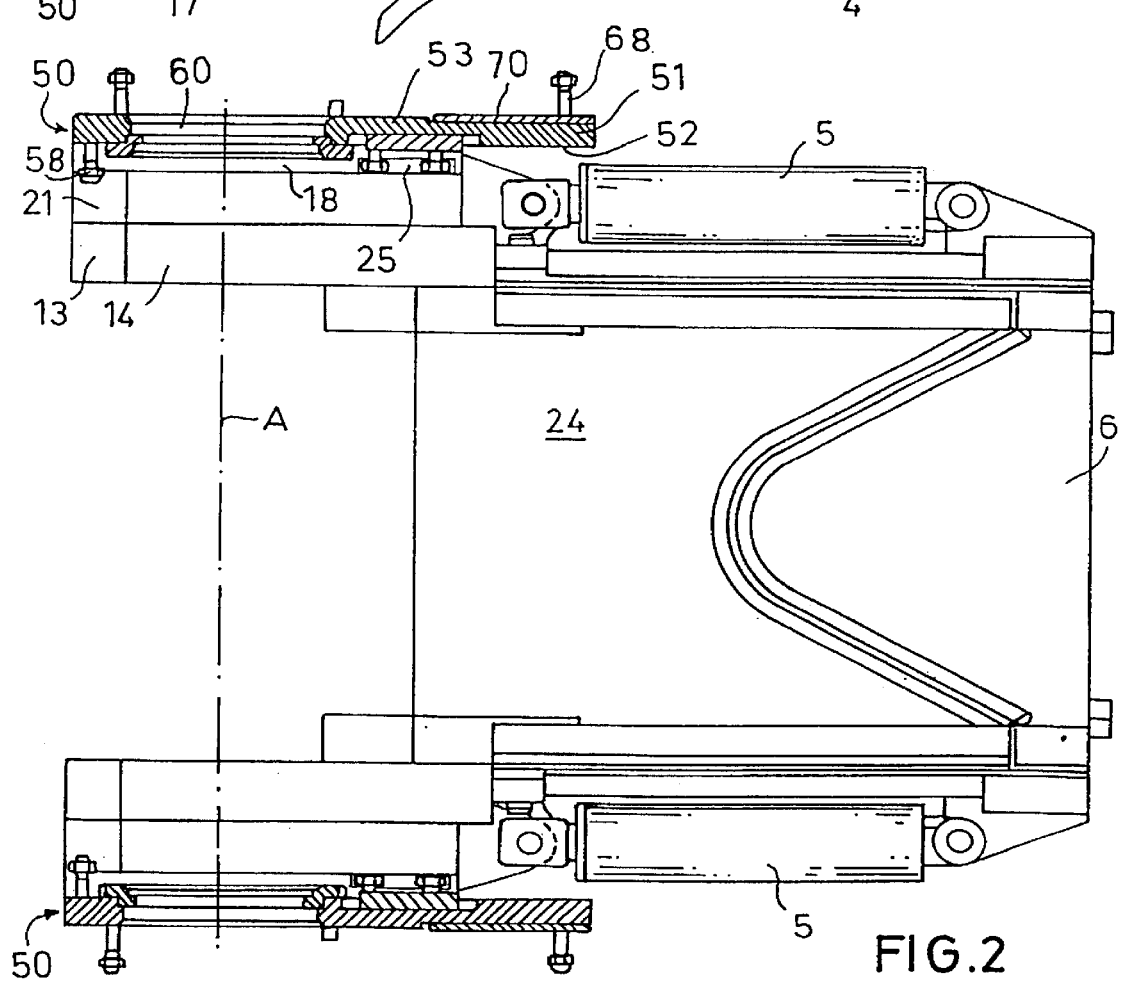
FIG. 2 shows a plan view of the drive station with adaptor plates on both flange mounting zones.
Figure 7:
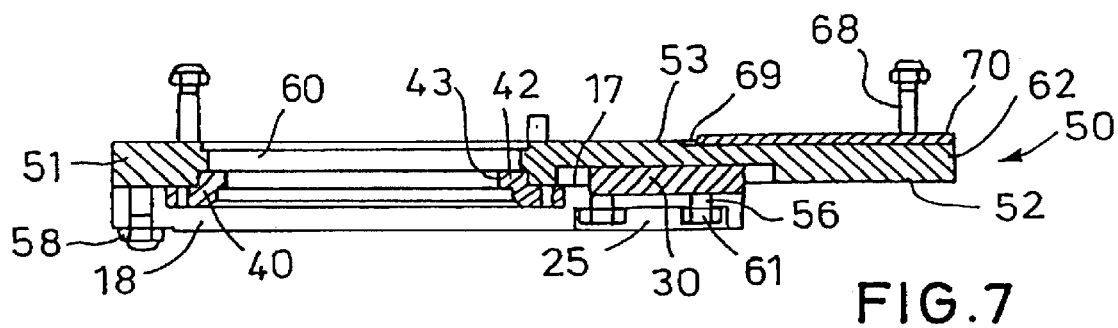
FIG. 7 shows a horizontal section through the adaptor plate shown in FIG. 4A.

The construction and function of the adaptor plate 50 according to the invention is explained in greater detail below with reference to the further Figures. FIG. 2 and FIG. 3 show the adaptor plate 50 in the assembled condition on the drive station 10. The drive shaft with the chain sprocket, would be assembled on the drive shaft axis A, is not shown. The adaptor plate 50 has a massive, some 7 cm thick base plate 51, which has a machine frame side inner side 52 and a drive side outer side 53. The base plate 51 has here, corresponding to the number of borings 20 in the flange mounting zone 17, altogether six vertically aligned stepped elongated holes, of which four elongated holes 54 are arranged on one side of a circular cut-out 60 and two elongated holes 55 are arranged on the other side of the cut-out 60. The elongated holes 54, 55 are gripped through by fastening screws 56 and 57, which can suitably be screwed into the borings 20 in the flange mounting zone or can be held by nuts 58 in them. The elongated holes 54 and 55 are each close to the upper and lower lateral edges of the adaptor plate 50 so that an even tightening of the adaptor plate 50 with high retention force is facilitated around the cut-out 60 and the coupling lead-through 16. As FIG. 2 shows, the heads 61 of the screws 56 make a positive engagement in a slot 25 in the inner side of the side cheek plate 18, whilst the nuts 58 come into abutment with the side cheek plate 18 and are drawn onto it. The representation of the upper adaptor plate 50 in FIG. 2 corresponds to the enlarged representation in FIG. 7.

Figure 4A:
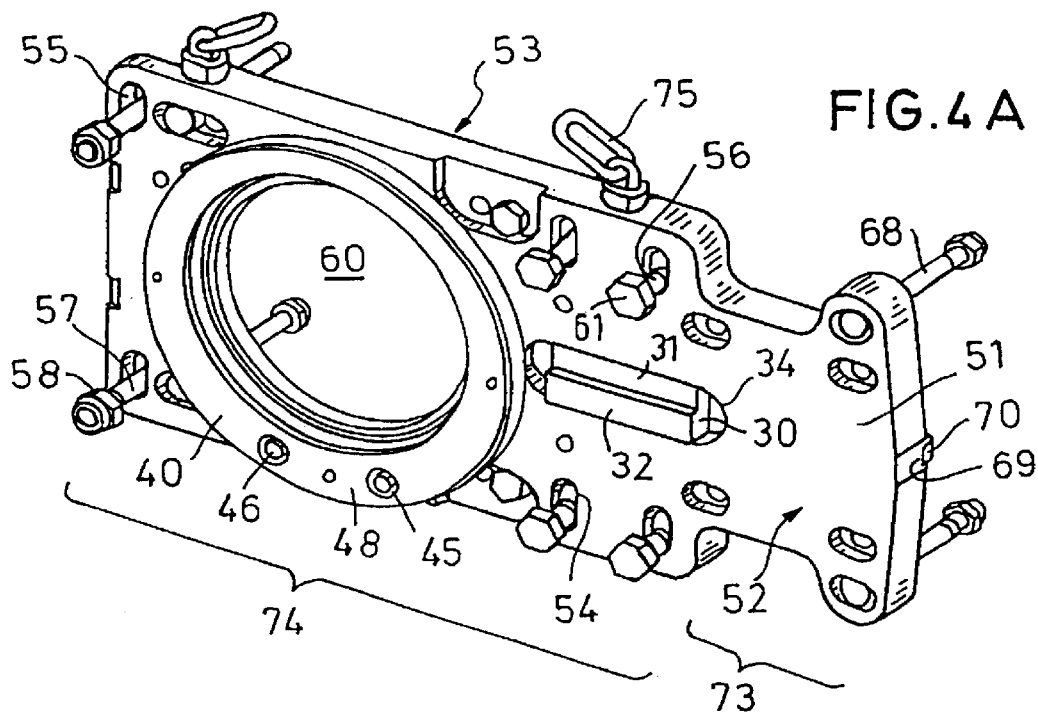
FIG. 4A shows a perspective view of the adaptor plate according to the present invention with the positions of the setting key, annular disc plate and fastening screws for the maximum upper assembly position.
Figure 4B:
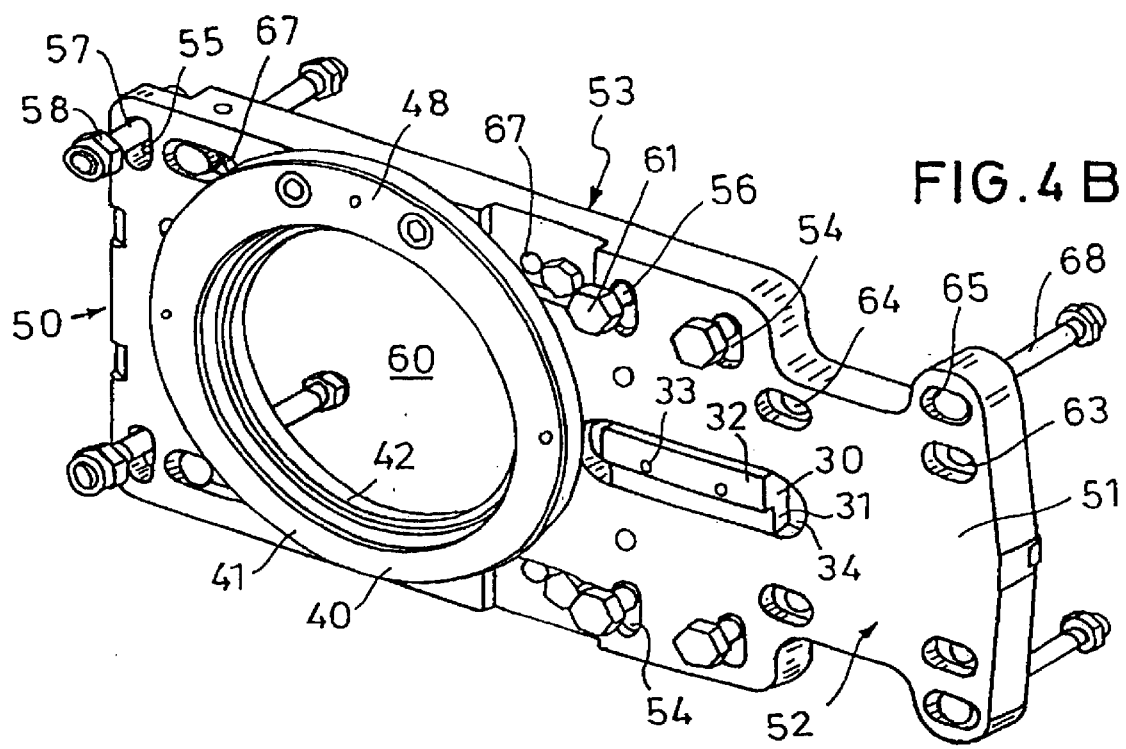
FIG. 4B shows a perspective view of the adaptor plate according to the present invention with setting key, annular disc plate and fastening screws for the maximum lower assembly position of the adaptor plate.
Figure 5:
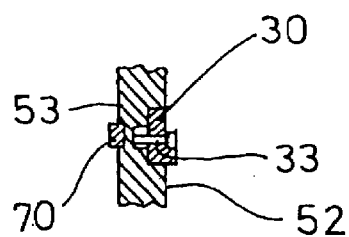
FIG. 5 shows a sectional side view of a section of the adaptor plate in the region of the setting keys.
Figure 6:
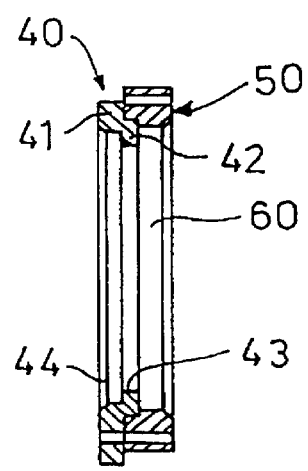
FIG. 6 shows a vertical section centrally through the coupling lead-through and the annular disc plate.

The details of the adaptor plate according to the invention are best seen from FIG. 4A and FIG. 4B. The difference between FIG. 4A and FIG. 4B comprises the position of the setting key 30, the relative positions of the fastening screws 56, 57 in the elongated holes 54, 55 and the setting of the eccentric ring plate 40. FIG. 4A shows the position of the setting key 30, annular disc plate 40 and fastening screws 56, 57 for an installation position with the adaptor plate 50 displaced to the maximum upwards, FIG. 4B the position of the screws 56, 57, setting key 30 and annular disc plate 40 for the lowest installation position. The asymmetrical setting key 30, which comprises a metal strip with an L-profile and has a broad arm 31 and a short shoulder 32, is screwed onto the base of a setting key cut-out 34 in the inner side 52 of the base plate 51 using internal hexagonal headed screws 33. The broad arm 31 of the setting key engages in the setting key cut-out 34 in the adaptor plate 50 with a positive engagement, whilst the short shoulder extends out from the inner side of the broad arm 31 and makes a positive engagement in a setting key groove 22 in the flange mounting zone 17 (FIG. 1) In the position according to FIG. 4A the shoulder 32 is positioned similarly to the screws 56, 57 downwards in the elongated holes 54, 55, so that the adaptor plate 50, is moved relatively far upwards when the shoulder 32 engages in the setting key groove 22 in the flange mounting zone 17 (FIG. 1). The reverse installation position with the shoulder 32 rotated upwards is shown correspondingly in FIG. 4B. Since the coupling lead-through 16 is not moved in the flange mounting zone 17, but maintains a constant height separation from the conveyor base 6, whilst the cut-out 60 in the flange plate 50 is moved relative to this an open transition arises between the cut-out 60 and the lead-through 16. In the installation positions shown in FIG. 4A and FIG. 4B the eccentric annular disc plate 40 with a larger machine frame side inner ring 41 and a smaller drive side outer ring 42 serve to fill out this open transition. The outer ring 42 closes a through opening 43 concentrically, whilst the larger inner ring has a through opening 44 arranged eccentrically to its actual middle axis. In the widest ring zone 48 of the inner ring 41, which lies below in FIG. 4A, above in FIG. 4B, stepped borings 45 are arranged in each case into which fastening screws 46 with their heads countersunk are screwed into corresponding tapped holes in the adaptor plate 50. In the installation condition as is shown for instance in FIG. 2, the larger inner ring 41 then fills out the coupling lead-through 16 completely whilst the smaller outer ring 42 fills out the cut-out 60 in the adaptor plate 50, as shown especially in FIG. 6 and FIG. 7. With a stepped cut-out 60 the outer ring 42 possibly lies only with positive engagement on a machine frame side annular shoulder. The annular disc plate 40 can also accept supporting forces in the vertical direction, so that the fastening screws in the elongated holes and the setting key 30 are partially relieved of loading. According to the configuration of the assembly unit of the drive shaft then the shaft end pins of the drive shaft engage through the lead-throughs 43, 44 in the annular disc plate 40 or the coupling sockets provided for coupling to the drive or to a gear box are supported in the lead-throughs 43, 44. The drive set, not shown, is, possibly with its gear box, flanged onto the drive side outer side 53 of the adaptor plate 50. To this end the stepped borings 63, 64, 65, 66, 67 (FIG. 4B) formed at various positions in the base plate 51 are used, in which four assembly screws 68 are already inserted. The adaptor plate 50 is further provided on the outer side 53 with a horizontally running setting key groove 69 (FIG. 3), into which a setting key 70 engages (FIG. 5). The setting key groove 69 in the outer side 53 of the plate lies centrally opposite to the setting key cut-out 34 in the inner side 52, but extends up to the adaptor plate side edge 62 in a fin-like like head piece 73 of the adaptor plate 50. The head piece 73 ends at the side here in an essentially rectangular base part 74 having the cut-out 60. In the front side of the base part 74 retaining hooks 75 can be screwed in, so as to be able to transport the adaptor plate 50 with a lifting jack. The position of the assembly screws can be varied for a different drive set, for instance.

Figure 8A:
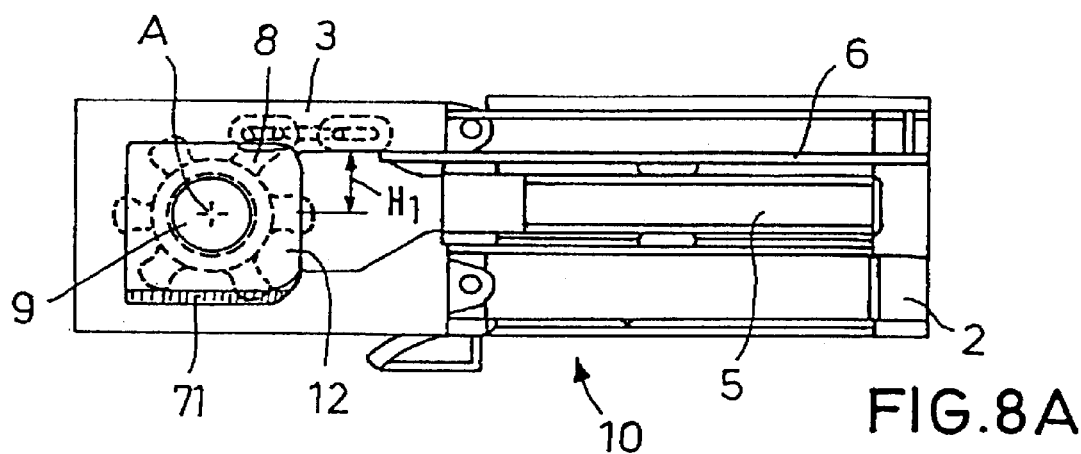
FIGS. 8A–C shows a schematic side view of a drive station with drive shafts in different assembly positions.
Figure 8B:
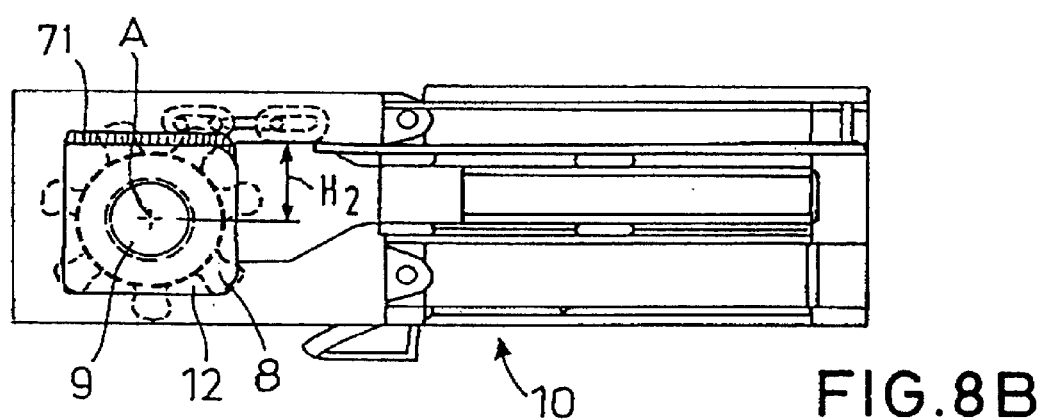
Figure 8C:
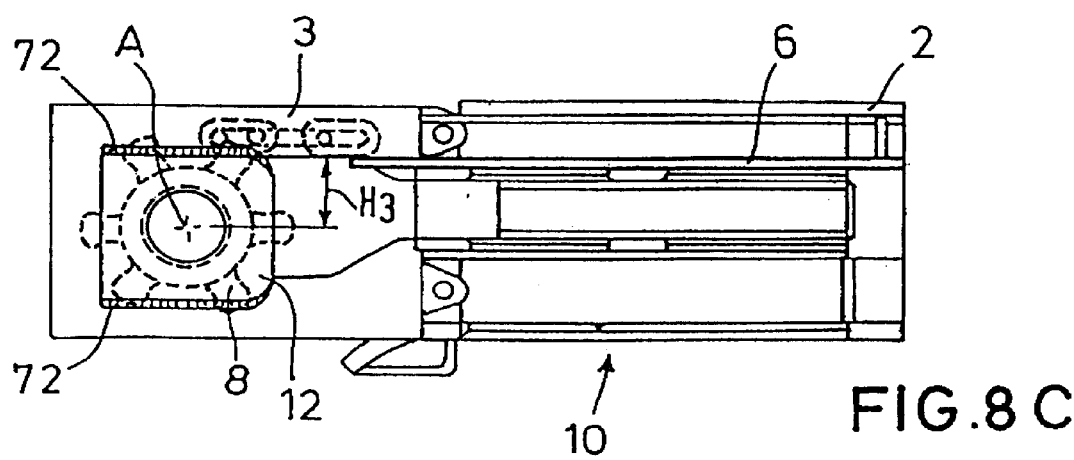

FIGS. 8A–8C show three different assembly positions for the adaptor plate and the drive shaft axis A relative to the position of the conveyor base 6. The distance between the height of the drive shaft axis A and the upper side of the conveyor base 6 is referenced $H_1$ in FIG. 8A, $H_2$ in FIG. 8B and $H_3$ in FIG. 8C. $H_1$ here corresponds to the uppermost assembly position corresponding to the fastening of the adaptor plate 50 according to FIG. 4A. $H_2$ corresponds to the fastening of the adaptor plate 50 according to FIG. 4B and $H_3$ corresponds to a middle assembly position, in which the screws each lie in the centre of the elongated holes. In FIGS. 8A–8C the essentially square bearing housings 12 are shown schematically, whilst the adaptor plates are not shown. To stabilise the highest assembly position, i.e. the least height difference $H_1$, a distance fillet 71 is introduced under the underside of the bearing housing 12. The thickness of the fillet 71 corresponds to the maximum possible movement of the bearing housing 12 between the upper brace 14 and the lower brace 13 in the bearing box (c.f. FIG. 1). In FIG. 8B the distance fillet 71 is arranged correspondingly above the bearing housing 12. In FIG. 8A and FIG. 8B the same chain (e.g. 34×126) is used. In FIG. 8A the drive shaft 9 has a chain sprocket with six teeth, in FIG. 8B a chain sprocket with seven teeth. The different assembly height positions $H_1$, $H_2$ can be set in simply by use of the adaptor plates, as previously described. The same machine frame with machine frame base 2 and tensioning frame part 3 can be used in this. Any desired intermediate position, especially a middle assembly position, can be attained, as FIG. 8C shows. For the middle assembly position two distance fillets 72 of the same thickness are pushed in respectively above and below the bearing housing 12. Not shown in detail is that for the assembly position according to FIG. 8C a setting key is used between the adaptor plate and the flange mounting zone, which has a T-profile, on which the shoulder is formed symmetrically and centrally.

For the specialist a multiplicity of deviations, which should fall within the area of protection spring from the foregoing description. As mentioned the adaptor plates could also be used together with other than the drive shafts and drive stations shown. The arrangement of the fastening holes, borings, lead-throughs and cut-outs as well as setting key cut-outs can resolve themselves differently according to the flange mounting zone present. The distance fillets could also be a component of locking pieces, not shown, with which the machine frame could be closed at its open machine frame ends or the bearing housings held in their position.

What is claimed is:

1. A drive station for a chain scraper conveyor for mining operations, with a machine frame having a conveyor base, on which can be mounted an exchangeable, drive shaft comprising an axle and vertical side cheeks, said drive shaft being joined torsionally fixed to a chain sprocket and which on at least one vertical side cheeks has a flange mounting zone with a coupling lead-through and borings for flange mounting a drive set which can be coupled to the drive shaft, in which adaptor plates are provided having a machine frame side inner side and a drive side outer side, the adaptor plate being mounted to the axle of the drive shaft with an adjustable height separation between the conveyor base and the drive shaft axis which can be fastened on the machine frame side inner sides in various height positions on the flange mounting zone and on the drive side outer side the drive set can be fastened.

2. A drive station according to claim 1, in which the adaptor plate has elongated holes perpendicular to the conveyor base, which can be engaged by fastening screws to fasten the adaptor plate using the borings in the flange mounting zone.

3. A drive station according to claim 2, in which the length of the elongate holes establishes the maximum height adjusting distance.

4. A drive station according to claim 1, in which the height position of the adaptor plate can be established by means of a setting key, which can be inserted between the machine frame and the adaptor plate and engages in associated setting key cut-outs.

5. A drive station according to claim 4, in which for different height positions of the adaptor plate different setting keys are provided with asymmetrically formed shoulders.

6. A drive station according to claim 5, in which the setting key comprises short metal rails with a T-profile or an L-profile.

7. A drive station according to claim 1, in which the adaptor plate has a groove engageable by the setting key on its drive side plate side and borings for flanging on the drive set whilst supporting a turning moment.

8. A drive station according to claim 1, in which coupling lead-throughs in the flange mounting zone are enclosed and circular and the adaptor plates have circular cut-outs whereby a stepped annular disc plate with an inner ring on the machine frame side and with a drive side outer ring engage in the cut-out to seal it.

9. A drive station according to claim 8, in which for different height positions different annular disc plates and/or annular disc plates which can be installed in different rotational positions are provided, whereby the rings of the annular disc plate which can be installed in different rotational positions are arranged eccentrically to each other.

10. A drive station according to claim 9, in which the larger inner ring has stepped through borings and can be fastened into the adaptor plate by means of screws which are countersunk in it, into tapped holes in the adaptor plate.

11. A drive station according to claim 1, in which the bearings for the drive shaft are arranged in essentially rectangular or square bearing housings, which can be pushed in between an upper brace and a lower brace into a window-like bearing box formed in the machine frame, whereby the bearing housings have an assembled height, which is less than the free height in the bearing box.

12. A drive station according to claim 11, in which the bearing box is closed on three sides and is open at the head end of the machine frame.

13. A drive station according to claim 12, in which the bearing housings can be slid into the bearing boxes with the interposition of distance fillets.

14. A drive station according to claim 13, in which the distance fillets are formed in one piece with closing parts with which the bearing boxes can be locked into the machine frame ends.

15. A drive station according to claim 14, in which centering pins are formed on the closing parts, which engage in centering holes in the bearing housings.

16. A drive station according to claim 1, in which it is formed as a tensioning frame whereby the tensioning frame part having the flange mounting zone for fastening the adaptor plate and formed for mounting the drive shaft can be moved relative to the machine frame base preferably by means of hydraulic cylinders.

17. A drive station according to claim 16, in which the tensioning frame part is provided with a drag plate, which is movable relative to the conveyor base, which overlaps the conveyor base up to a tongue-like cut-out on the side connecting to the conveyor pans.

18. An adaptor plate for a drive station according to claim 1.

19. A drive shaft station according to claim 1, in which the exchangeable drive shaft is an assembly unit.

* * * * *